United States Patent [19]

Kendzior

[11] Patent Number: 5,291,130
[45] Date of Patent: Mar. 1, 1994

[54] VEHICLE WHEEL SPEED SENSOR EMPLOYING AN ADAPTABLE ROTOR CAP

[75] Inventor: James M. Kendzior, Kalamazoo, Mich.

[73] Assignee: Eaton Corporation, Cleveland, Ohio

[21] Appl. No.: 8,028

[22] Filed: Jan. 25, 1993

[51] Int. Cl.$^5$ .................... G01P 3/488; H02K 11/00; B60B 27/00
[52] U.S. Cl. ................... 324/174; 188/181 R; 310/68 B; 310/155; 301/108.1
[58] Field of Search .......... 324/163, 173, 174, 207.15, 324/207.25; 340/671; 310/155, 168, 68 B; 188/181 R, 181 A; 73/517 R, 518, 519; 301/108.1

[56] References Cited

U.S. PATENT DOCUMENTS

| | | | |
|---|---|---|---|
| 3,473,120 | 10/1969 | Ruof | 324/174 X |
| 3,683,219 | 8/1972 | Kruse | 324/174 X |
| 3,887,046 | 6/1975 | Bueler | 188/181 |
| 3,916,234 | 10/1975 | Stigall et al. | 310/155 |
| 3,928,780 | 12/1975 | Vannini et al. | 310/168 |
| 3,934,685 | 1/1976 | Jovick | 188/181 |
| 3,944,864 | 3/1976 | Jovick | 310/168 |
| 3,998,298 | 12/1976 | Fleagle | 188/181 |
| 5,111,098 | 5/1992 | Peck et al. | 310/268 |

Primary Examiner—Gerard R. Strecker
Attorney, Agent, or Firm—L. H. Uthoff

[57] ABSTRACT

A vehicle wheel speed sensor incorporated on an axle spindle hub and hub cap assembly of the type using permanent magnets to generate a magnetic field having a magnetic path conducted through a plurality of teeth on a flange extending from the hub cap into a plurality of teeth on a stator with relative motion therebetween upon rotation of the wheel where the frequency of the change in the magnetic reluctance varies at a frequency proportional to the wheel speed. The stator is mounted to the end of the axle spindle by a securing bolt so that the stator can be easily removed for service without disturbing the axle bearings. As a part of the stator assembly, a locating plate is provided which allows the operating gap between the teeth formed in the flange and the teeth formed in the stator to be easily established upon assembly of the hub cap to the wheel hub by allowing the rotor to contact the locating plate when the hub cap securing bolts have been loosened and the axle is supported. The flange pilots on the inner annular surface in the wheel hub thereby reducing the cost of assembly and improving overall functionality.

5 Claims, 3 Drawing Sheets

VEHICLE WHEEL SPEED SENSOR EMPLOYING AN ADAPTABLE ROTOR CAP

RELATED APPLICATIONS

This application is related to U.S. Ser. No. 07/789,712 filed on Nov. 8, 1991 entitled "Vehicle Wheel Speed Sensor Employing A Locating Plate" and assigned to the same assignee, Eaton Corporation, as is this application.

FIELD OF THE INVENTION

This invention relates to a wheel speed sensor assembly and, specifically, to a wheel speed sensor assembly whose operating clearance is easily adjusted.

BACKGROUND OF THE INVENTION

Prior art wheel speed sensors for vehicles have generally fallen into two broad categories, those employing either active or passive sensors. Active sensors require a power signal to be fed to a sensor component, whereas passive sensors need no outside power and usually consist of a coil surrounding a magnet material which is positioned in close proximity to a circular shaped element having a plurality of teeth which rotates with the wheel hub. The coil and magnet are mounted to a stationary part of the vehicle or axle assembly and the relative motion of the teeth in the rotor passing over a magnetized pole piece induces a change in reluctance which can be detected in an electronics package which is connected to the coil. A device of this type is described in U.S. Pat. No. 4,986,605, the disclosure which is expressly incorporated herein by reference, where a pulser and sensor unit are located inside the wheel hub mounted on the axle spindle in close proximity to a rotor connected to the wheel hub having a series of rectangular teeth.

Another type of passive wheel speed sensor is described in U.S. Pat. No. 3,887,046 and describes a sensor having a stator and a rotor where the stator is mounted on an axle and includes an electrical coil of wire surrounding the axle where the coil sets in a metal carrier having pole pieces and a plurality of magnets angularly disposed where the pole pieces are in close proximity to a multi-segmented rotor which is mounted to a hub cap which turns with the wheel hub.

A problem with these types of wheel speed sensors is that they require precision fabrication of the components so that, upon assembly, the limited clearance of the pole pieces to the rotor is maintained throughout the rotation of the wheel hub and hub cap assembly so that the signal due to the passing of the rotor teeth over the pole pieces is maximized.

Also, another problem with devices of this type is that the mounting of the stator piece is secured by the axle mount and is piloted on the outside diameter of the axle spindle which results in a large and complicated mounting system for the stator disc. If service of the stator is required, the prior art systems require that the spindle retention nut be disturbed which complicates the servicing process. Another problem occurs upon reassembly where the clearance between the rotor and the stator pole pieces is difficult to set and poor sensor performance is the potential result of that difficulty.

Another problem with wheel speed sensor assemblies is that the rotor cap often sets the clearance between the stator and the rotor and this rotor cap is simply clamped through some type of fastening means making the setting of the operator clearance between the stator and the rotor quite difficult. Some method of piloting the rotor cap to the hub and wheel structure would facilitate sensor assembly setup for proper operating clearance.

In the prior art, the rotor and hub cap were two different parts which were assembled together. This assembly process involved pressing into the hub cap a pre-shaped rotor. However, during this process it is very difficult to maintain the required roundness and tolerances for the rotor to be properly functional and rotate in close proximity relative to the stator. To assure this function, the rotor typically has to be machined after assembly with the attendant adding machining and pre-shaping adding considerable cost to the product.

SUMMARY OF THE INVENTION

This invention provides a convenient method of securing the stator plate disc to the vehicle axle by way of a tapped pole in the axle centerline where the stator is piloted by the end of the axle shaft on an inside diameter surface machined into the stator and is held in place by a nut that engages a threaded shaft that extends and engages the threaded portion of the vehicle axle. In this manner, the stator assembly, which includes the coil and the magnets, is easily removed from the vehicle without disturbing the spindle nut or spindle bearing.

The invention also provides for a convenient method of setting the operating gap between the stator teeth and the teeth residing in the rotor where the stator assembly includes a clearance plate having an outside diameter approximately the same as that of the stator. Upon assembly, the hub cap is loosened and the rotor is allowed to contact the clearance plate due to the force of gravity acting on the hub cap while the axle is supported by a separate means (such as vehicle jack stands) instead of the vehicle wheel and tire assembly. Thereupon, the hub cap bolts are tightened and the vehicle is lowered upon the tires and wheels which results in a loading of the wheel hub bearings, thereby providing the desired operating gap between the stator and the rotor.

Using the present invention, the assembly of the wheel speed sensor is easier with higher reliability and integrity of the functionality of the wheel speed sensor assembly. The manufacturability of the wheel speed sensor assembly is also improved by reducing machining operations. Also, using the present invention, a spacer can be used to locate the rotor at the required distance from the hub base thereby providing for a parts commonality which reduces costs and facilitates assembly and manufacturing environment. It is therefore, a provision of the present invention to provide a wheel speed sensor whose operating gap between the rotor and the stator can be easily set and secured.

Another provision of the present invention is to provide a wheel speed sensor that can be adapted to a variety of hub widths where a spacer is used to locate the rotor at the desired distance from the hub base.

Another provision of the present invention is to provide a wheel speed sensor whose operating gap between the rotor and the stator can be easily set and secured where the rotor is piloted to the hub assembly.

Still another provision of the present invention is to provide a wheel speed sensor assembly that can be easily removed and then reassembled to the vehicle axle with the correct operating gap between the stator and the rotor.

DETAILED DESCRIPTION OF THE PREFERRED EMBODIMENT

Figure 1:
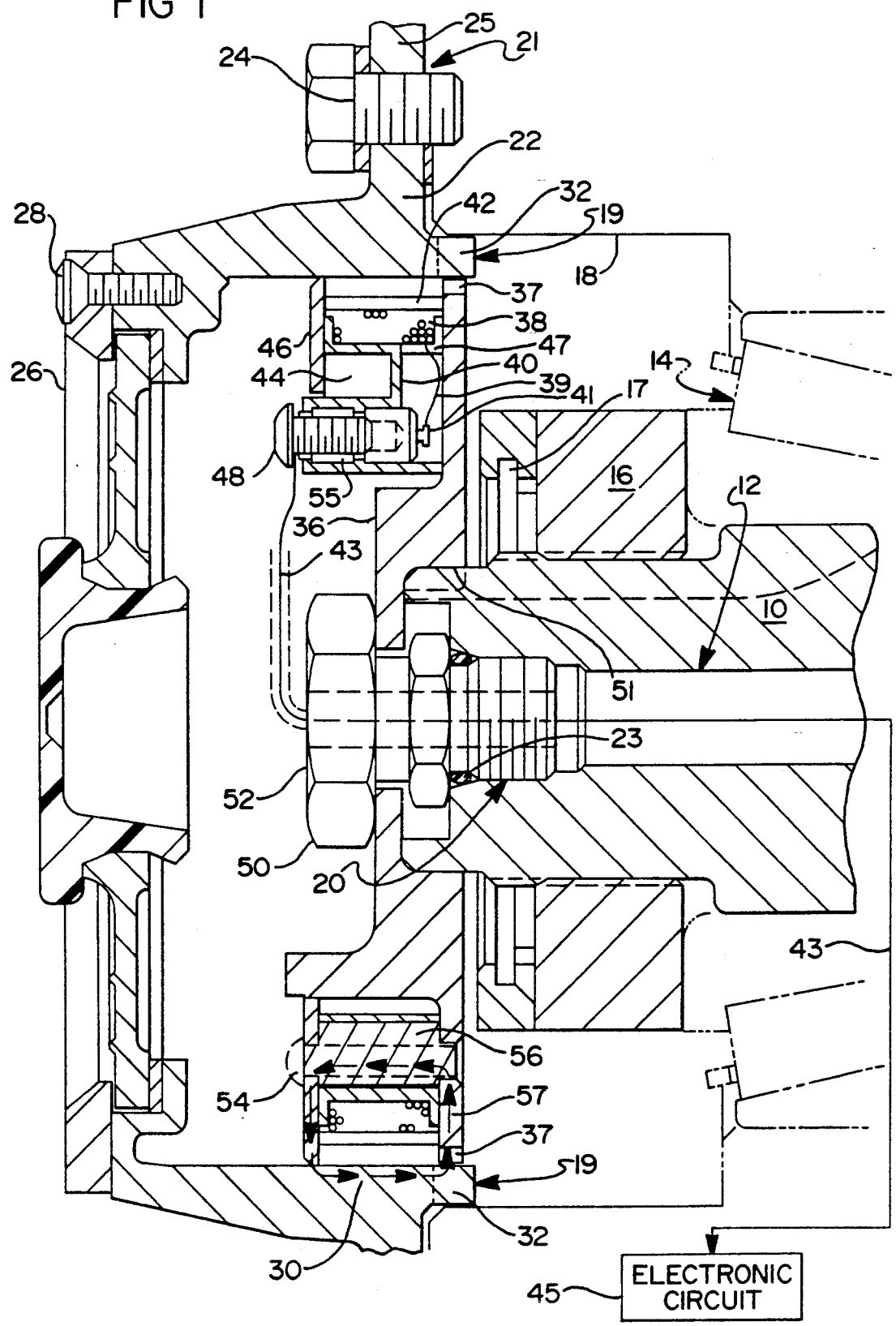
FIG. 1 is a cross-sectional view of the present invention as installed on the end of a vehicle axle and hub assembly.

Referring to FIG. 1, a typical installation of a truck wheel and hub assembly is shown mounted on an axle spindle (10) where the wheel hub (18) rotates about the axle spindle (10) by way of bearing member (14) where the wheel speed sensor of the present invention is carried on the axle spindle (10) and a hub cap (22) which is secured to the wheel hub (18) by way of a plurality of mounting bolts (24) which pass through a like number of bolt holes (21) (see FIG. 3) formed in a flange section (25) of the hub cap (22). The bearing member (14) is held in place and preloaded by spindle hub (16) which is secured in position by lock ring (17). The truck axle spindle (10) contains an axial hole (12) running along the centerline and ending with a tapped region (20) so as to accept a threaded bolt which is sealed by an "O"-ring (23). The hub cap cover (26) is secured to the hub cap (22) with a plurality of securing bolts (28). The function of the hub cap cover (26) is to prevent contaminants from entering the speed sensor and bearing components.

Figure 3:
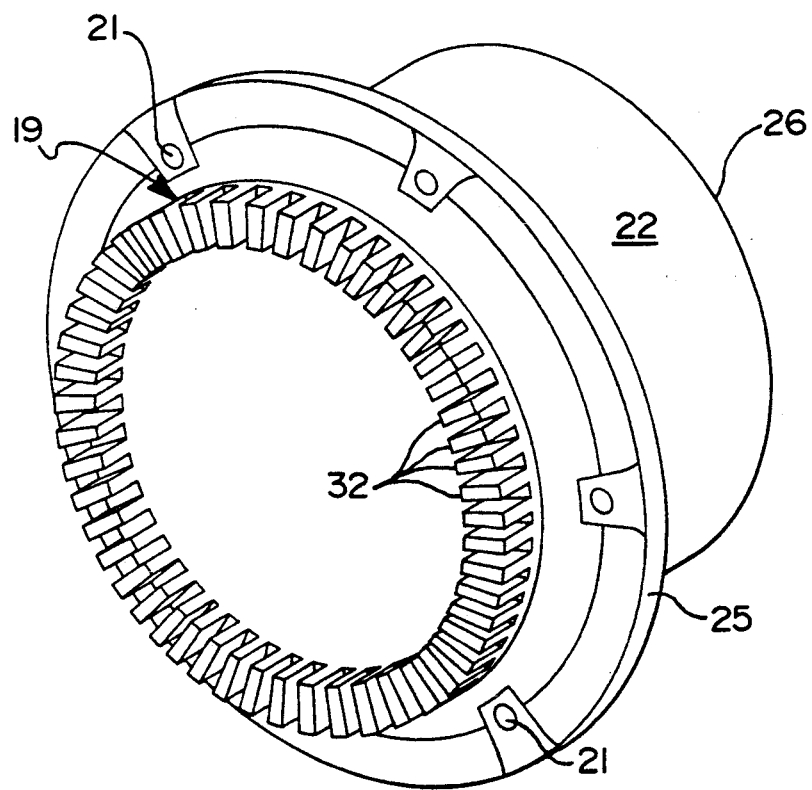
FIG. 3 is a perspective view of the hub cap of the wheel speed sensor of the present invention.

The hub cap (22) has a pilot extension (19), also referred to as a flange, that axially extends and pilots on the wheel hub (18) as more clearly shown in FIG. 3 where the pilot extension (19) is an annular ring extension on the hub cap (22) extending into and piloted by the wheel hub (18). The annular pilot extension (19) has a multiplicity of teeth (32) axially extending and cut into the pilot extension (19) where the pilot extension (19) engages the wheel hub (18) where the multiplicity of gaps between the multiplicity of teeth radially extend along a line from the axis of rotation. By machining the teeth (32) directly into the hub cap (22), and then piloting the hub cap (22) into the wheel and hub assembly by means of pilot extension (19), the operating gap between the teeth (32) and the stator teeth (37) is more accurately maintained as opposed to other methods which typically use a separate machined member called a rotor having rotor teeth which is pressed into a hub cap (22) to replace the pilot extension (19) where the hub cap (22) is not piloted to the wheel hub (18) similar to that described in patent application U.S. Ser. No. 07/789,712, the disclosure of which is hereby incorporated by reference.

The pilot extension (19) is made of a magnetically conductive material which includes a multiplicity of teeth (32) formed therein that are uniform in dimension and extended along an axis parallel to the axle spindle (10) centerline and provide a magnetic flux path that is segmented by the voids between the teeth (32). The rotor (30) and pilot extension (19) are portions of the hub cap 22 and are constructed of a material that easily conducts magnetic flux such as SAE 1010 steel or a high iron content powder metal material. The speed sensor of the present invention includes a number of components that are carried inside a cavity formed by the hub cap (22), the hub cap cover (26) and the wheel hub (18).

Figure 2:
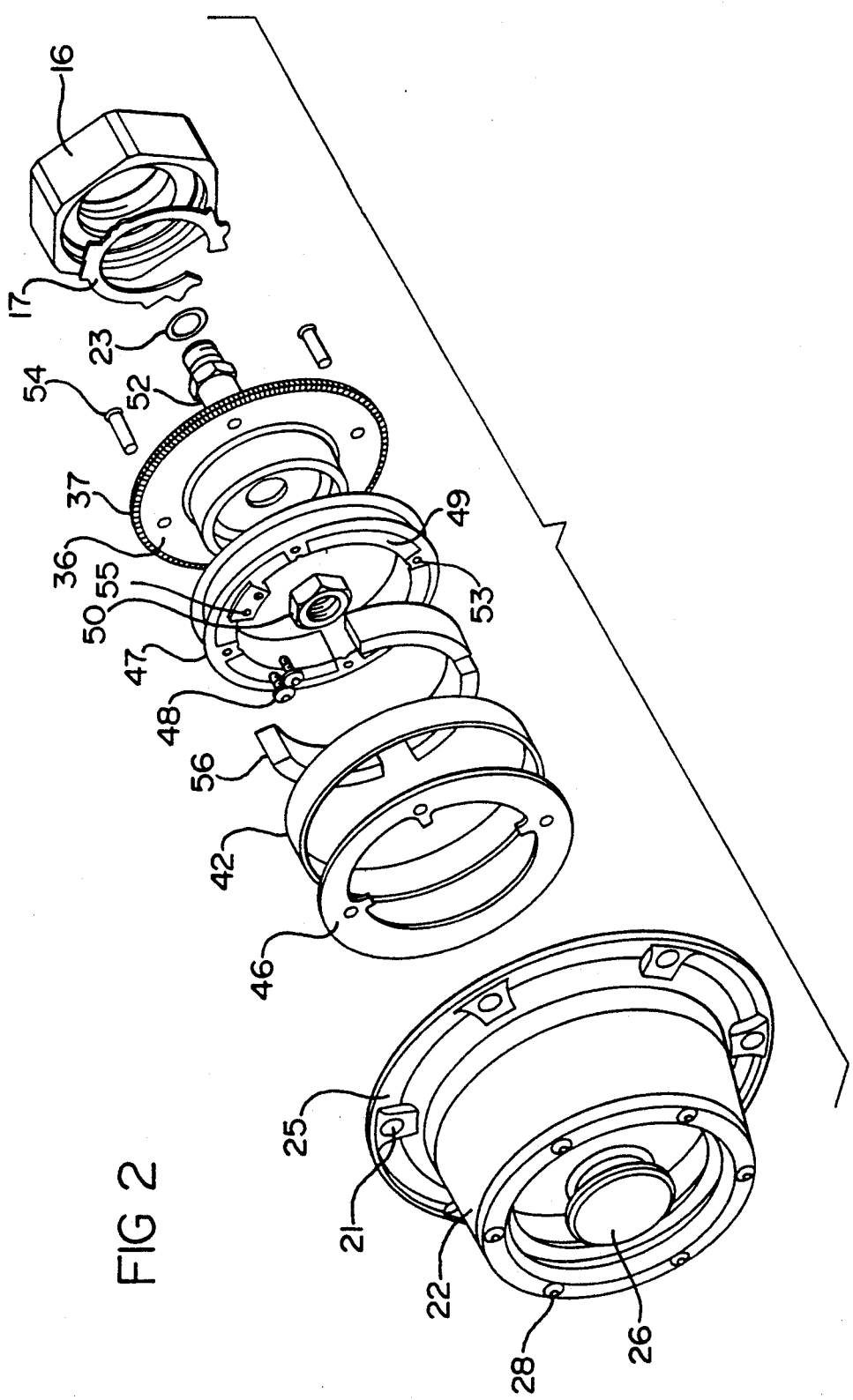
FIG. 2 is a perspective view of the wheel speed sensor assembly of the present invention.

The stator disc (36) is secured to and piloted by the axle spindle (10) with a bolt (52) which engages the threads of the axle spindle (10) at tapped region (20) where a securing nut (50) is threaded onto the end of the securing bolt (52) and secures the stator disc (36) to the axle spindle (10). Other components are mounted to the stator disc (36) and include an electrical coil (38) which consists of a multiplicity of turns of electrical wire which encircle the axle spindle (10) centerline and are wound on the outside section of support housing (47) which is attached to the stator disc (36) and covered by shield 42. The output leads (39) of electrical coil (38) are routed to electrical terminals (41) which are in contact with two lead bolts (48) which are electrically connected to two lead wires (43) which are routed through the bolt (52) into the axial hole in the axle spindle (10). The lead wires (43) are routed to a commonly used signal conditioning circuit such as the electronic circuit (45) shown connected to the lead wires (43) in FIG. 1 whose output is routed to any number of truck systems such as an antilock braking system or an electronic transmission control unit. Also contained on the stator disc (36) are a number of magnets (56) which are shaped to fit into a like number of cavities contained in support housing (47) which is more clearly shown in FIG. 2. The magnets (56) are arranged so that the north poles face in the same direction relative to the stator disc (36) and are inserted in cavities (49) formed in the support housing (47). The magnets (56) are shaped in the form of segments of an annular ring. Three magnets (56) are shown in FIG. 2 which fit into a like number of appropriately shaped cavities (49) to hold the magnets (56) in position such that like magnetic poles face axially inward. The magnets are separated by mounting segments (53) which surround the rivets (54) which secure the stator disc (36) and the support housing (47) to the spacer plate (46). The support housing (47) can be made of a plastic material which is non-magnetic in nature and carries a pair of metal inserts (51) which are internally drilled and tapped to accept the terminal lead bolts (48). The two terminal lead bolts (48) are supported in the terminal support housing (40) which extends inwardly from the support housing (47) defining a void space (44) and includes threaded holes (55) which engage the terminal lead bolts (48).

On the outside face of the support housing (47) is a spacer plate (46) which is secured to the support housing (47) by a plurality of rivets (54) which are secured on one side at the support housing (46) and pass through the support housing (47) and are secured on the opposite side of the stator disc (36). The spacer plate (46) has an outside diameter that is approximately the same as the stator disc (36) which are in turn slightly smaller than the internal diameter of the rotor (30).

The stator disc (36) contains a multiplicity of stator teeth (37) evenly spaced and of uniform dimension which are preferably of the same number of teeth as are contained at the peripheral edge of the rotor (30). The stator disc (36) is secured to the end of the axle spindle (10) by way of a securing nut (50) which is threaded on the bolt (52) and is piloted on the outside diameter of the end portion of axle spindle (10) where a key (51) is extended form the stator disc (36) into a key way in the axle spindle (10) to prevent relative rotation between the stator disc (36) and the axle spindle (10).

In operation, the rotor (30) rotates with the truck wheel which is mounted to the wheel hub (18). The stator disc (36) is stationary relative to the axle spindle

(10) and thus, there is relative motion between the rotor (30) and the stator disc (36) where the rotor teeth (32) pass over the stator teeth (37) and thereby change the magnetic reluctance from a high value to a low value as the rotor teeth (32) and the stator teeth (37) align one with another. A magnetic field is produced by the magnets (56) and is shown by magnetic flux line (57) which illustrates the flow of magnetic flux through the magnets (56), the spacer plate (46), the hub cap (22), the rotor teeth (32), the stator teeth (37), and through the stator disc (36) as most clearly seen by way of reference to FIG. 1. A magnetic reluctance variation causes a voltage to be induced in the stator electrical coil (38) where this voltage is routed to an electronics package by way of output leads (39) and into electrical terminals (41) and into lead wires (43). The frequency of the induced voltage increases proportionally with the speed of the truck wheel, thus allowing a vehicle speed to be calculated.

The magnetic reluctance is minimized when the rotor teeth (32) coincide or are in alignment with the stator teeth (37) and is maximized when the rotor teeth (32) are in alignment with the gap between the stator teeth (37). Conventional signal conditioning and measurement techniques are used to interpret the signal generated in the electrical coil (38).

During the initial assembly process or upon reassembly after servicing, the operating gap between the stator teeth (37) and the inside diameter of the rotor (30) can be easily established with the use of a spacer plate (46). The truck axle is supported so that none of the vehicle weight is carried on the wheel hub (18) and the wheel assembly mounted thereto. This action unloads the wheel bearings (14) so that the weight of the wheel hub (18) and the hub cap (22) cause the free play in the axle bearing (14) to be taken up on a side opposite to that when the vehicle is in a normal operating configuration. The mounting bolts (24) that secure the hub cap (22) to the wheel hub (18) are loosened so that the hub cap (22) can be shifted around to a slight degree and the hub cap (22) is then shifted to one side so that the rotor (30) comes in contact with the spacer plate (46) at a point opposite that established by a line running from the normal tire-road contact point through the centerline of the axle and where it intersects the rotor (30). Once the hub cap (22) has been shifted so that the rotor (30) contacts the spacer plate (46) at the point described supra, the hub cap mounting bolts (24) are tightened. Once the axle is lowered so that the tire comes in contact with the road surface and supports the vehicle, the free play in the wheel bearing (14) allows the rotor (30) to separate from the spacer plate (46) so that the proper operating clearance between the rotor teeth (32) and the stator teeth (37) is established. Thus, the spacer plate (46) functions to set the operating clearance between the rotor (30) and the stator (36) and also conducts the magnetic field generated by the magnets (56) and must be fabricated from a material that is magnetically conductive.

Although the invention has here and above been described with respect to the illustrated embodiment, it will be understood that the invention is capable of modification and variation, and is therefore intended as limited only by the following claims.

I claim:

1. A vehicle wheel speed sensor comprising:
   a wheel hub having an axis of rotation rotationally mounted to a vehicle axle spindle having an axial passageway therethrough, said wheel hub having a hub cavity therein where said hub cavity has an inner annular surface;
   a hub cap secured to said wheel hub forming a cavity having a flange extending from said hub cap and piloting on said inner annular surface of said hub cavity, said flange having a plurality of flange teeth extending in an axial direction and axially extending into said hub cavity;
   a stator disc having a plurality of stator teeth formed on a circular peripheral edge, said stator disc non-rotatably attached to said axle spindle, said circular peripheral edge having an outer diameter slightly smaller than an inner diameter of said flange and in substantial alignment with said flange, said flange teeth being in relatively close proximity to said stator teeth for magnetic interaction therewith;
   a plurality of magnets having a curved inner and a parallel curved outer radial surface mounted on said stator disc, said magnets oriented having matching magnetic poles facing axially inward to create a magnetic field which travels through said stator teeth and said flange teeth;
   an annular sensing coil having a multiplicity of turns of electrical wire surrounding said axis of rotation of said wheel hub and interposed between said magnets and inner annular surface and attached to said stator disc;
   electronic circuit means for processing an electrical signal;
   a lead wire connected to said sensing coil and extending into said spindle axial passageway and connected to said electronic circuit means;
   securing means holding said stator disc to said axle spindle; and
   a locating plate nonrotatably attached to said stator disc, said locating plate having a circular peripheral edge in close proximity to said inner annular surface of said hub cap, said annular sensing coil interposed between said locating plate and said stator disc.

2. The vehicle wheel speed sensor of claim 1, wherein said securing means is a threaded bolt engaging a threaded region in said spindle axial passageway.

3. The vehicle wheel speed sensor of claim 1, wherein said hub cap and said flange are made of a ferromagnetic material, said flange cylindrically shaped surrounding said stator disc.

4. The vehicle wheel speed sensor of claim 1, wherein said hub cap and said flange are made of a high iron content powdered metal material.

5. A wheel speed sensor comprising:
   a vehicle axle extending outwardly;
   a hub having an axis of rotation and rotatably mounted to said vehicle axle, said hub having a cavity with an annular inner surface;
   a stator formed in the shape of a disc and affixed to said vehicle axle and having an outer edge equidistant from said axis of rotation of said hub, said stator having a multiplicity of teeth formed on said outer edge;
   a hub cap having a ring like inner surface and having an axially extending annular flange, said flange engaging and piloted by said annular inner surface of said hub, said flange having a multiplicity of flange teeth formed therein, said flange teeth being in relatively close spacial proximity to said stator teeth, said stator having an outer diameter slightly smaller than an inner diameter of said annular inner surface of said hub where said flange teeth magnetically interact with said stator teeth where said interaction varies as said hub cap rotates relative to said stator;

a plurality of semi-circular magnet segments mounted adjacent to said stator substantially encircling said axis of rotation of said hub;

an annular sensing coil having a multiplicity of turns of electrical wire surrounding said axis of rotation of said hub interposed between said magnets and said inner surface of said hub cap;

a locating plate nonrotatably attached to said stator, said locating plate having a circular peripheral edge in close proximity to said inner surface of said hub cap and an outer diameter approximately equivalent to said outer diameter of said stator, said annular sensing coil interposed between said locating plate and said stator;

wherein said locating plate contacts said inner surface of said hub cap when the vehicle axle is supported thereby unloading said wheel hub; and wherein said locating plate has a relatively small operating clearance with said inner surface of said hub cap when the vehicle axle is loaded for operation.

* * * * *